United States Patent
Dalrymple et al.

(10) Patent No.: US 7,182,136 B2
(45) Date of Patent: Feb. 27, 2007

(54) METHODS OF REDUCING WATER PERMEABILITY FOR ACIDIZING A SUBTERRANEAN FORMATION

(75) Inventors: Eldon D. Dalrymple, Duncan, OK (US); Larry Eoff, Duncan, OK (US); B. Raghava Reddy, Duncan, OK (US); Jim Venditto, Muscat (OM)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/612,271

(22) Filed: Jul. 2, 2003

(65) Prior Publication Data
US 2005/0000694 A1 Jan. 6, 2005

(51) Int. Cl.
*E21B 43/28* (2006.01)
*E21B 33/138* (2006.01)

(52) U.S. Cl. .................. 166/281; 166/295; 166/307; 507/221; 507/224; 507/225; 507/230

(58) Field of Classification Search ............... 166/275, 166/283, 305.1, 294, 282, 300, 307, 295, 166/281; 507/211, 221, 224, 225, 230, 277
See application file for complete search history.

(56) References Cited

U.S. PATENT DOCUMENTS 2,863,832 A  12/1958  Perrine ..................... 252/8.55
(Continued)

FOREIGN PATENT DOCUMENTS
DE  2 250 552  4/1974
(Continued)

OTHER PUBLICATIONS

Botermans, C. Wouter, et al, *Relative Permeability Modifiers: Myth of Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cgi?paper=00068973.pdf.

(Continued)

*Primary Examiner*—George Suchfield
(74) *Attorney, Agent, or Firm*—Robert A. Kent; Crutsinger & Booth

(57) ABSTRACT

The present invention provides a method of stimulating a subterranean formation penetrated by a well. The formation has a water-bearing section and a hydrocarbon-bearing section. The method includes the steps of: (a) introducing into the formation an aqueous treatment fluid containing a hydrophobically-modified relative permeability modifier, and (b) introducing an acidizing treatment fluid into the formation. The hydrophobically-modified RPM can be formed and introduced into the formation in several ways. For example, the hydrophobically-modified RPM can be the reaction product of a hydrophilic polymer and a hydrophobic compound that are capable of reacting with each other. The hydrophilic polymer is a polymer containing reactive amino groups in the polymer backbone or as pendant groups, which are capable of reacting with a hydrophobic alkyl halide compound. The hydrophobically-modified RPM can include, for example, a polymer of DMAEMA quaternized with an alkyl halide, wherein the alkyl halide has an alkyl chain length of 6 to 22 carbons.

41 Claims, 2 Drawing Sheets

U.S. PATENT DOCUMENTS

| | | | | |
|---|---|---|---|---|
| 2,910,436 | A | 10/1959 | Fatt et al. | 252/8.55 |
| 3,215,199 | A | 11/1965 | Dilgren | 166/38 |
| 3,251,415 | A | 5/1966 | Bombardier et al. | 166/42 |
| 3,297,090 | A | 1/1967 | Dilgren | 166/38 |
| 3,307,630 | A | 3/1967 | Dilgren et al. | 166/38 |
| 3,382,924 | A | 5/1968 | Veley et al. | 166/42 |
| 3,434,971 | A | 3/1969 | Atkins | 252/8.55 |
| 3,441,085 | A | 4/1969 | Gidley | 166/307 |
| 3,451,818 | A | 6/1969 | Wareham | 96/78 |
| 3,744,566 | A * | 7/1973 | Szabo et al. | 166/275 |
| 3,910,862 | A | 10/1975 | Barabas et al. | 260/79.3 MU |
| 4,129,183 | A | 12/1978 | Kalfoglou | 166/300 |
| 4,142,595 | A | 3/1979 | Anderson et al. | 175/72 |
| 4,158,521 | A | 6/1979 | Anderson et al. | 405/264 |
| 4,158,726 | A | 6/1979 | Kamada et al. | |
| 4,299,710 | A | 11/1981 | Dupre et al. | 252/8.5 A |
| 4,366,071 | A | 12/1982 | McLaughlin et al. | 252/8.55 R |
| 4,366,072 | A | 12/1982 | McLaughlin et al. | 252/8.55 R |
| 4,366,073 | A | 12/1982 | McLaughlin et al. | 252/8.55 R |
| 4,366,074 | A | 12/1982 | McLaughlin et al. | 252/8.55 R |
| 4,374,739 | A | 2/1983 | McLaughlin et al. | 252/8.55 R |
| 4,393,939 | A | 7/1983 | Smith et al. | 166/293 |
| 4,395,340 | A | 7/1983 | McLaughlin | 252/8.55 D |
| 4,401,789 | A | 8/1983 | Gideon | 524/827 |
| 4,439,334 | A | 3/1984 | Borchardt | 252/8.55 D |
| 4,440,649 | A | 4/1984 | Loftin et al. | 252/8.5 C |
| 4,447,342 | A | 5/1984 | Borchardt et al. | 252/8.55 D |
| 4,460,627 | A | 7/1984 | Weaver et al. | 427/212 |
| 4,462,718 | A | 7/1984 | McLaughlin et al. | 405/264 |
| 4,532,052 | A * | 7/1985 | Weaver et al. | 507/222 |
| 4,536,297 | A | 8/1985 | Loftin et al. | 252/8.5 C |
| 4,536,303 | A | 8/1985 | Borchardt | |
| 4,536,305 | A | 8/1985 | Borchardt et al. | 252/8.55 R |
| 4,554,081 | A | 11/1985 | Borchardt et al. | 252/8.5 A |
| 4,563,292 | A | 1/1986 | Borchardt | 252/8.55 R |
| 4,604,216 | A | 8/1986 | Irvin et al. | 252/8.51 |
| 4,627,926 | A | 12/1986 | Peiffer et al. | 252/8.55 R |
| 4,671,883 | A | 6/1987 | Connell | |
| 4,693,639 | A | 9/1987 | Hollenbeak et al. | 405/263 |
| 4,699,722 | A | 10/1987 | Dymond et al. | 252/8.551 |
| 4,730,028 | A | 3/1988 | Bock et al. | 526/225 |
| 4,814,096 | A | 3/1989 | Evani | |
| 4,828,726 | A | 5/1989 | Himes et al. | 252/8.553 |
| 4,959,432 | A | 9/1990 | Fan et al. | 526/287 |
| 5,071,934 | A | 12/1991 | Peiffer | 526/307 |
| 5,097,904 | A | 3/1992 | Himes | 166/294 |
| 5,146,986 | A | 9/1992 | Dalrymple | 166/294 |
| 5,160,642 | A | 11/1992 | Schield et al. | 252/8.551 |
| 5,197,544 | A | 3/1993 | Himes | 166/294 |
| 5,208,216 | A | 5/1993 | Williamson et al. | 507/120 |
| 5,244,042 | A | 9/1993 | Dovan et al. | 166/270 |
| 5,271,466 | A | 12/1993 | Harms | 166/300 |
| 5,342,530 | A | 8/1994 | Aften et al. | 252/8.551 |
| 5,379,841 | A | 1/1995 | Pusch et al. | 166/295 |
| 5,382,371 | A * | 1/1995 | Stahl et al. | 507/221 |
| 5,597,783 | A | 1/1997 | Audibert et al. | 507/120 |
| 5,607,902 | A | 3/1997 | Smith et al. | 507/120 |
| 5,637,556 | A | 6/1997 | Argillier et al. | 507/120 |
| 5,646,093 | A | 7/1997 | Dino | 507/209 |
| 5,669,456 | A | 9/1997 | Audibert et al. | 175/72 |
| 5,720,347 | A | 2/1998 | Audibert et al. | 166/270 |
| 5,728,653 | A | 3/1998 | Audibert et al. | 507/222 |
| 5,735,349 | A | 4/1998 | Dawson et al. | 166/295 |
| 5,887,653 | A | 3/1999 | Bishop et al. | 166/281 |
| 5,944,106 | A | 8/1999 | Dalrymple et al. | 166/281 |
| 5,972,848 | A | 10/1999 | Audibert et al. | 507/119 |
| 5,979,557 | A * | 11/1999 | Card et al. | 166/300 |
| 5,990,052 | A * | 11/1999 | Harris | 507/214 |
| 6,020,289 | A | 2/2000 | Dymond | 507/120 |
| 6,070,664 | A | 6/2000 | Dalrymple et al. | 166/281 |
| 6,124,245 | A | 9/2000 | Patel | |
| 6,187,839 | B1 | 2/2001 | Eoff et al. | 523/130 |
| 6,228,812 | B1 * | 5/2001 | Dawson et al. | 507/221 |
| 6,237,687 | B1 | 5/2001 | Barbee, Jr. et al. | 166/278 |
| 6,253,851 | B1 | 7/2001 | Schroeder, Jr. et al. | 166/278 |
| 6,277,900 | B1 | 8/2001 | Oswald et al. | 523/130 |
| 6,283,210 | B1 | 9/2001 | Soliman et al. | 166/270 |
| 6,359,047 | B1 | 3/2002 | Thieu et al. | |
| 6,364,016 | B1 | 4/2002 | Dalrymple et al. | 166/270 |
| 6,380,137 | B1 | 4/2002 | Heier et al. | 507/121 |
| 6,476,169 | B1 | 11/2002 | Eoff et al. | 526/307 |
| 6,476,283 | B1 | 11/2002 | Devore et al. | 585/250 |
| 6,497,283 | B1 | 12/2002 | Eoff et al. | 166/293 |
| 6,516,885 | B1 | 2/2003 | Munday | 166/295 |
| 6,569,983 | B1 | 5/2003 | Treybig et al. | 528/102 |
| 6,609,578 | B2 | 8/2003 | Patel et al. | 175/64 |
| 6,710,107 | B2 | 3/2004 | Audibert et al. | 524/5 |
| 6,787,506 | B2 | 9/2004 | Blair et al. | |
| 6,803,348 | B2 | 10/2004 | Jones et al. | 507/221 |
| 2003/0019627 | A1 | 1/2003 | Qu et al. | 166/281 |
| 2003/0191030 | A1 | 10/2003 | Blair et al | |
| 2004/0045712 | A1 | 3/2004 | Eoff et al. | 166/293 |
| 2004/0102331 | A1 | 5/2004 | Chan et al. | 507/100 |
| 2004/0171495 | A1 | 9/2004 | Zamora et al. | 507/100 |
| 2004/0220058 | A1 | 11/2004 | Eoff et al. | |
| 2004/0229756 | A1 | 11/2004 | Eoff et al. | 507/219 |
| 2004/0229757 | A1 | 11/2004 | Eoff et al. | |
| 2005/0000694 | A1 | 1/2005 | Dalrymple et al. | |
| 2005/0230116 | A1 | 10/2005 | Eoff et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 0 0193 365 A1 | 4/2002 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 2000/78890 | 12/2000 |
| WO | WO 02/097236 | 12/2002 |
| WO | WO 2003/056130 | 7/2003 |
| WO | WO 04/101706 A1 | 11/2004 |
| WO | WO 2004/094781 | 11/2004 |

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.

Halliburton, 2001 Press Releases, *First Halliburton H2Zero™ Conformance Solution Job Performed for a Producing Well in*

*Egypt*, 2002 Halliburton, pp. 1-2, printed from website @ www.halliburton.com/news/archive/2001/esgnws_111901.jsp.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

Foreign communication from a related counterpart application dated Oct. 19, 2004.

U.S. Appl. No. 10/763,800, filed Jan. 24, 2004, Eoff et al.
U.S. Appl. No. 10/780,995, filed Feb. 18, 2004, Eoff et al.
U.S. Appl. No. 10/806,894, filed Mar. 23, 2004, Eoff et al.
U.S. Appl. No. 10/825,001, filed Apr. 15, 2004, Eoff et al.
U.S. Appl. No. 10/872,997, filed Jun. 21, 2004, Eoff et al.
U.S. Appl. No. 10/881,198, filed Jun. 29, 2004, Dalrymple et al.
U.S. Appl. No. 10/893,210, filed Jul. 16, 2004, Eoff et al.
U.S. Appl. No. 11/102,062, filed Apr. 8, 2005, Sierra et al.

Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).

Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).

Xu, et al.., Modeling of Laser Spallation Drilling of Rocks for Gas-and Oilwell Drilling, SPE 95746, 2005.

Gahan, et al., Effect of Downhole Pressure Conditions on High-Power Laser Perforation, SPE 97093, 2005.

Gahan, et al., Analysis of Efficient High-Power Fiber Lasers of Well Perforation, SPE 90661, 2004.

Parker, et al., Well Perforation Using High-Power Lasers, SPE 84418, 2003.

Parker, et al., Laser Drilling: Effects of Beam Application Methods on Improving Rock Removal, SPE 84353, 2003.

Bai, et al., Improved Determination of Stree-Dependent Permeability for Anisotropic Formations, SPE 78188, 2002.

Proett, et al., Advanced Permeability and Anisotropy Measurements While Testing and Sampling in Real-Time Using a Dual Probe Formation Tester, SPE 62919, 2000.

Proett, et al., Advanced Dual Probe Formation Tester with Transient, Harmonic, and Pulsed Time-Delay Testing Methods Determines Permeability, Skin and Anisotropy, SPE 64650, 2000.

\* cited by examiner

BP = BACK PRESSURE REGULATOR
P = DIFFERENTIAL PRESSURE TRANSDUCER

METHODS OF REDUCING WATER PERMEABILITY FOR ACIDIZING A SUBTERRANEAN FORMATION

STATEMENT REGARDING FEDERALLY SPONSORED RESEARCH OR DEVELOPMENT

Not applicable

REFERENCE TO MICROFICHE APPENDIX

Not applicable

FIELD OF THE INVENTION

The present invention relates to improvements in the stimulation of hydrocarbon production from subterranean formations. More particularly, the present invention relates to methods of acidizing subterranean formations to stimulate or increase hydrocarbon production.

BACKGROUND OF THE INVENTION

Generally, well treatments involve the injection of a fluid into an oil or gas formation to stimulate production from the well by increasing the permeability of the oil or gas through the formation.

A widely used stimulation technique is acidizing, in which an aqueous acid treatment is introduced into the formation to dissolve acid-soluble materials that clog or constrict formation channels. In this way, hydrocarbon fluids can more easily flow from the formation into the well. Also, acid treatments facilitate the flow of injected treatment fluids from the well into the formation.

Another common stimulation technique is hydraulic fracturing, in which a fracturing fluid is injected through a well into the surrounding formation at a sufficient pressure to fracture the formation adjacent to the well, creating a channel for fluid flow through the formation back to the well. Usually a particulate material, often referred to as a "proppant," is deposited into the fracture to help prop the fracture open for fluid flow back after the hydraulic pressure is released.

Acidizing techniques can be carried out as "matrix acidizing" procedures or as "acid fracturing" procedures.

In matrix acidizing, the acidizing treatment fluid is injected from the well into the formation at a rate and pressure below the pressure sufficient to create a fracture in the formation. The acid permeates into channels and dissolves materials that clog or constrict the channels, thereby increasing permeability of the formation. Thus, an increase in permeability is affected primarily by the reaction of the acid within the formation, and little or no permeability increase is due to induced fractures within the formation.

In acid fracturing, an increase in permeability is affected by fractures as well as by the acid etching through the channels within the formation. The acidizing treatment fluid is injected into the well that is disposed within the formation to be fractured. Sufficient pressure is applied to the acidizing treatment fluid to cause production of one or more fractures in the formation.

While hydrocarbon producing wells are usually completed in hydrocarbon-producing formations, the formations frequently contain layers of water-bearing sections or may be located adjacent to water-bearing sections. The high mobility of the water often allows it to flow into the wellbore by way of natural fractures and/or high permeability streaks present in the formation. Over the life of such wells, the ratio of water to hydrocarbons recovered often becomes so high that the cost of producing the water, separating it from the hydrocarbons, and disposing of the waste water represents a significant economic loss.

Furthermore, when an acidizing treatment fluid is required to increase the productivity of a hydrocarbon-bearing interval, the aqueous fluid tends to predominately enter a water-bearing section instead of a hydrocarbon-bearing section. This is because the water-bearing section is relatively more permeable to the aqueous fluid than the hydrocarbon-bearing section. Thus, acid stimulation often results in increasing the water cut because of the preferential stimulation of the water-bearing section.

The production of water with hydrocarbons, i.e., oil and/or gas, from wells constitutes a major problem and expense in the production of hydrocarbons from subterranean formations. The expense includes the energy in moving the water to the surface, separating the water from the produced hydrocarbon, and disposing of the waste water.

A variety of techniques to divert the aqueous acidizing treatment fluid away from a water-bearing section and into a hydrocarbon-bearing section have been attempted. By injecting particulates, foams, or blocking polymers prior to or along with acidizing treatments, the water-bearing section is attempted to be plugged off. In this way, the acid treatment can predominantly enter and stimulate the hydrocarbon-bearing section rather than the water-bearing section.

While the use of these water-blocking techniques has achieved varying degrees of success, there are many challenges in their use. For example, the blocking polymers are injected into the formation and cross-linked to form stiff gels capable of stopping or reducing the flow of the undesired water. Even when a polymer solution is properly placed in a water-producing zone, however, the cross-linked gels formed often do not remain stable in the zone due to thermal degradation and/or differences in the adsorption characteristics of the polymer and associated cross-linker and the like.

Furthermore, techniques geared toward injecting materials designed to plug off the water-bearing section are limited because many require expensive zonal isolation. Also, zonal isolation is sometimes inaccurate, which may lead to inadvertently plugging and damaging the hydrocarbon-bearing section. Damage to hydrocarbon-producing pathways is undesirable since it reduces well productivity and profitability. The desired end result is to reduce the effective permeability to water in the treated portion of the zone without loss of effective permeability to hydrocarbons.

Recently, chemicals have been utilized to decrease the production of water with hydrocarbons. These chemicals are referred to as relative permeability modifiers ("RPMs"), sometimes referred to as disproportionate permeability reducers or selective plugging systems. An RPM polymer such as polyacrylamide is dissolved in water and pumped into a subterranean formation that produces water and hydrocarbon, reducing the permeability of water through the formation without substantially affecting the permeability of hydrocarbon. That is, water permeability modifying chemicals such as polyacrylamide have been introduced into hydrocarbon and water producing formations so that the chemicals attach to adsorption sites on surfaces within the porosity of the formations.

The presence of the RPM chemicals in the formations has the effect of reducing the flow of water through the formations. The purpose of water permeability modifying chemicals in hydrocarbon and water producing formations to decrease the production of water involves less risk than other techniques such as blocking the flow of water with cross-linked polymers, and has the advantage that they do not require expensive zonal isolation techniques.

The use of such conventional water permeability modifying chemicals, e.g., polyacrylamides, however, has heretofore resulted in only small temporary reductions in water production and/or unacceptable levels of reduction in hydrocarbon production. Conventional RPM polymers have provided poor performance due to inadequate retention within the formation. Many of these conventional RPM water-control compounds are unstable in acids and heavy brines and/or they may degrade with increased temperature, rendering them useless in many downhole applications.

Thus, there is a need for improved methods of treating subterranean formations to direct the acidizing treatment fluid away from the water-bearing section and into sections capable of producing hydrocarbon, while maintaining stability of such treatment fluid in the downhole acidizing environment.

SUMMARY OF THE INVENTION

According to the invention, it is recognized that conventional RPM polymers, such as polyacrylamides, are formed of monomer units that are hydrophilic. The invention provides an aqueous well treatment fluid containing a hydrophobically-modified, water-soluble relative permeability modifier (sometimes referred to herein as "hydrophobically-modified RPM"). Such a hydrophobically-modified RPM can be used in an acidizing well-treatment process.

According to a further aspect of the invention, the hydrophobically-modified RPM is preferably the reaction product of a hydrophilic polymer and a hydrophobic compound that are capable of reacting with each other. Hydrophilic polymers suitable for use in the invention are preferably polymers containing reactive amino groups in the polymer backbone or as pendant groups, which are capable of reacting with a hydrophobic alkyl halide compound. Hydrophobic compounds that are capable of reacting with reactive amino groups include alkyl halides having an alkyl chain length of 6 to 22 carbons. Accordingly, as used herein, the term "hydrophobically modified" includes the quaternization of at least some of the amino groups of the hydrophilic polymer with an alkyl halide, wherein the alkyl chain length is 6 to 22 carbons.

According to yet a further aspect of the invention, the hydrophobically-modified RPM is preferably the reaction product of a hydrophilic polymer and a hydrophobic compound that are capable of reacting with each other, as described above, but the hydrophilic polymer and hydrophobic compound are mixed in-situ during a well stimulation process. In this aspect, the well-treatment solution further comprises a surfactant capable of promoting the dissolution of the hydrophobic compound within the aqueous solution.

According to yet another further aspect of the invention, the hydrophobically-modified RPM polymer is preferably prepared from the polymerization reaction of at least one hydrophilic monomer and at least one hydrophobically-modified hydrophilic monomer.

The current invention provides improved methods for stimulating or re-stimulating a hydrocarbon producing formation using an aqueous solution capable of reducing or precluding the production of water from a subterranean formation. The aqueous solution is preferably pumped into the wellbore prior to an acidizing treatment. Use of a pre-reacted hydrophobically-modified RPM in the solution eliminates the need for a surfactant in the well treatment solution and permits operation at a lower pH in the downhole environment.

These and other aspects of the invention will be apparent to one skilled in the art upon reading the following detailed description. While the invention is susceptible to various modifications and alternative forms, specific embodiments thereof will be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims. The compositions can comprise, consist essentially of, or consist of the stated materials. The method can comprise, consist essentially of, or consist of the stated steps with the stated materials.

BRIEF DESCRIPTION OF THE DRAWING

The accompanying views of the drawing are incorporated into and form a part of the specification to illustrate several aspects and examples of the present invention, wherein like reference numbers refer to like parts throughout the figures of the drawing. These figures together with the description serve to explain the general principles of the invention. The figures are only for the purpose of illustrating preferred and alternative examples of how the various aspects of the invention can be made and used and are not to be construed as limiting the invention to only the illustrated and described examples. The various advantages and features of the various aspects of the present invention will be apparent from a consideration of the drawings.

DETAILED DESCRIPTION

Figure 1:
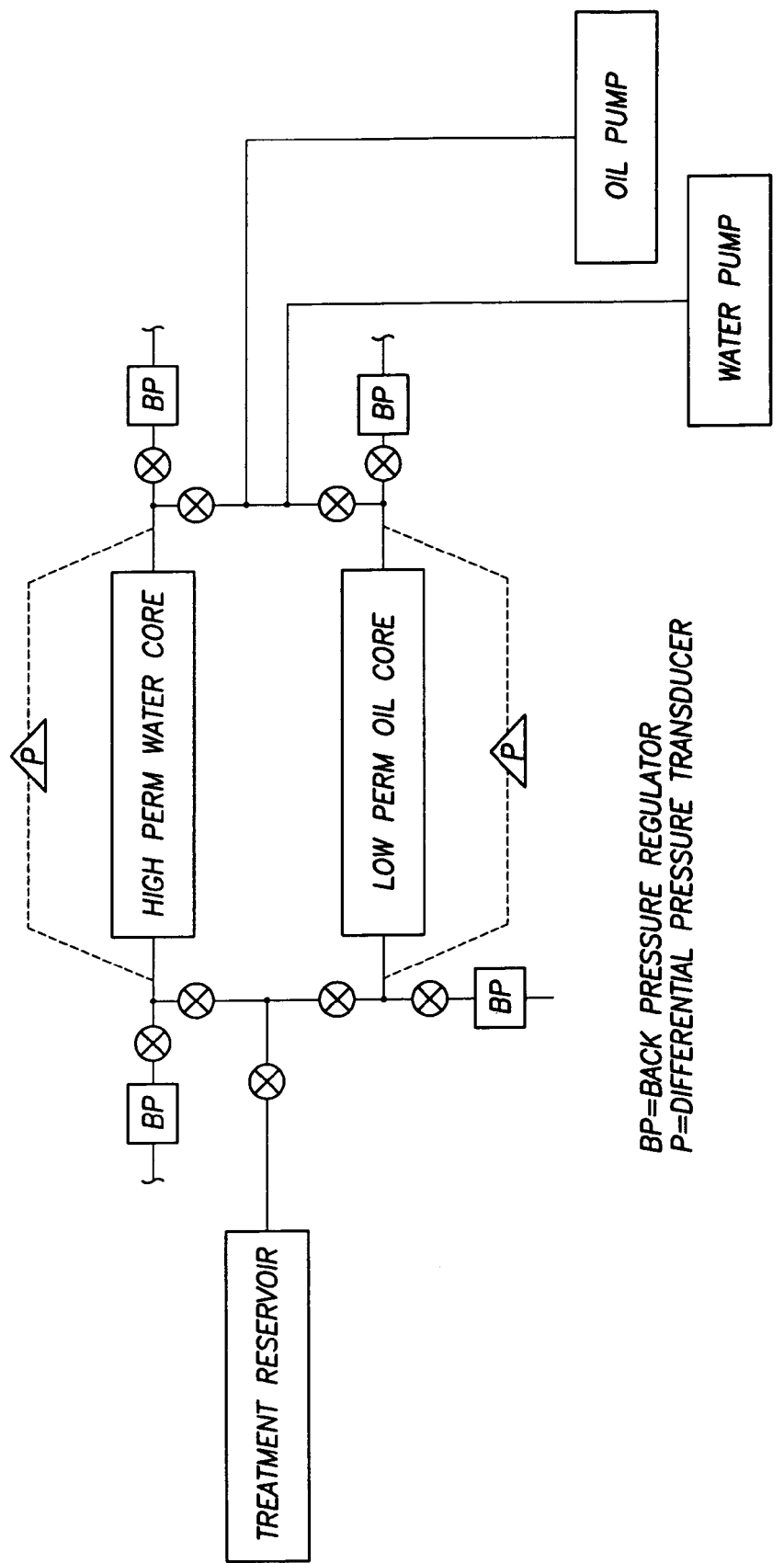
FIG. 1 is a parallel flow test schematic for testing core samples.

The present invention provides a method of acidizing a subterranean formation penetrated by a well, the method comprising the steps of: (a) introducing into the formation an aqueous treatment fluid containing a hydrophobically-modified RPM; and (b) introducing an acidizing treatment fluid into the formation.

The treatment solutions and methods of the present invention are applicable in both newly-drilled formations and in formations requiring re-stimulation. The solutions and methods of the present invention are particularly useful for formation re-stimulations where hydrocarbons will be present in the formation zones. In contrast to other permeability modification solutions, the current invention retains its effectiveness even in the presence of hydrocarbons.

As used herein, "water soluble" is expressly defined to mean at least 0.01 weight percent ("wt %") soluble in distilled water.

A molecule (e.g., a polymer) can have a hydrophilic part or monomer and a hydrophobic part or monomer. As used herein, a molecule as a whole is considered hydrophilic when it is water soluble.

As used herein, a relative permeability modifier or "RPM" is expressly defined to be a polymeric material that, when tested in an aqueous fluid, the polymeric material is capable of imparting a resistance factor for water greater than a resistance factor for hydrocarbon. This is typically measured using a sandstone core of about 2.5 cm diameter by about 14 cm long and having an initial permeability to brine of about 1000 md. Resistance factor is calculated by dividing the initial permeability to brine (or hydrocarbon) by the permeability to brine (or hydrocarbon) after the RPM treatment. Preferably, the RPM is capable of being dissolved in water at a concentration of at least 0.2% by weight and when tested at that concentration is capable of imparting a resistance factor for water of greater than about 3 and a resistance factor for hydrocarbon of less than about 2.

It is to be understood that the hydrophobically-modified RPM polymer can be pre-reacted before it is used in a well treatment process or it can be formed in situ by appropriate reaction during the process, in which case a surfactant can be used to dissolve the hydrophobic compound in the treatment solution.

The water utilized to form the aqueous solutions and in the methods according to this invention can be fresh water, salt water, sea water, brine, or any other aqueous liquid which does not adversely react with other components of the treating fluid. The water used in well treating fluids normally contains one or more salts for inhibiting the swelling of clays in the subterranean formations or zones being treated or to weight the treating fluid. The most common clay-inhibiting salt utilized is potassium chloride, but other salts can also be used.

As used in the present invention, the term "water-bearing section" of a subterranean formation refers to any portion of the formation that is capable of producing water. Accordingly, the term "water-bearing section" includes a hydrocarbon-bearing section that has sufficiently high water saturation such that water can be produced with hydrocarbon.

The aqueous treatment fluid according to the invention can be introduced into the formation prior to, simultaneously with, and/or after the acidizing treatment fluid. Most preferably, however, the treatment fluid is introduced into the formation before and/or simultaneously with the acidizing treatment fluid. When introduced simultaneously with the acidizing treatment fluid, a hydrophobically-modified RPM can be mixed with the acidizing treatment fluid.

According to a further aspect of the invention, the hydrophobically-modified RPM is preferably the reaction product of a hydrophilic polymer and a hydrophobic compound that are capable of reacting with each other. Hydrophilic polymers suitable for use in the aqueous solutions of the invention are preferably polymers containing reactive amino groups in the polymer backbone or as pendant groups, which are capable of reacting with hydrophobic alkyl halide compounds.

More preferably, the hydrophilic polymer contains dialkyl amino pendant groups. Most preferably, the hydrophilic polymer contains a dimethyl amino pendant group and contains at least one monomer selected from dimethylaminoethyl methacrylate ("DMAEMA") or dimethylaminopropyl methacrylamide. Suitable hydrophilic polymers include homo-, co-, or terpolymers. Examples of such reactive hydrophilic polymers include but are not limited to polyethyleneimine, polyvinylamine, poly(vinylamine/vinyl alcohol), chitosan, polylysine, and alkyl acrylate polymers in general. Additional examples of alkyl acrylate polymers include but are not limited to polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). The presently most preferred hydrophilic polymers are polydimethylaminoethyl methacrylate and polydimethylaminopropyl methacrylamide.

Hydrophobic compounds that are capable of reacting with amino groups include alkyl halides having an alkyl chain length of 6 to 22 carbons. Accordingly, as used herein, the term "hydrophobically modified" includes the quaternization of at least some of the hydrophilic polymer amino groups with an alkyl halide, wherein the alkyl chain length is 6 to 22 carbons.

The reaction of the hydrophilic polymer and hydrophobic compound yields a hydrophobically-modified RPM, i.e. a hydrophobically-modified, water-soluble, relative permeability modifier. Typically, the resulting polymers have molecular weights in the range of about 250,000 to about 3,000,000.

Following preparation of the hydrophobically-modified RPM, the hydrophobically-modified RPM is dissolved in an aqueous solution. Typically, the hydrophobically-modified RPM is present in a concentration from about 0.02% to about 3% by weight. Preferably, the hydrophobically-modified RPM is present in a concentration from about 0.05% to about 1% by weight. Water suitable for use in this embodiment of the current invention is defined above.

A well treatment solution comprising the pre-reacted hydrophobically-modified RPM can be adjusted to a pH more suited to the environment of the formation. Typically, the pH of the well treatment solution comprising the pre-reacted hydrophobically-modified RPM will be between about 4 and about 8, unless mixed with an acidizing treatment fluid.

The aqueous solutions according to the present invention may also contain other well treatment compounds such as but not necessarily limited to clay stabilizers, scale inhibitors, and corrosion inhibitors. For example, the aqueous solution may also contain salts suitable for inhibiting the swelling of clays.

Additionally, gelling agents, such as the galactomannan gelling agents described below may be used, preferably in amounts ranging from about 0.06% to about 0.72% by weight. Preferably, the concentration of the galactomannan gelling agent will be in the range of about 0.12% to about 0.36% by weight with the most preferred concentration being about 0.30% by weight.

Further, the solution may optionally contain any suitable proppant known to those skilled in the art.

According to yet a further aspect of the invention, the hydrophobically-modified RPM is preferably the reaction product of a hydrophilic polymer and a hydrophobic compound that are capable of reacting with each other, as described above, but wherein the hydrophilic polymer and hydrophobic compound are mixed in-situ during the well stimulation process.

Preferably, the hydrophilic polymer comprises from about 0.1% to about 2% by weight of the aqueous solution and the hydrophobic compound comprises from about 0.01% to about 1% by weight of the aqueous solution. More preferably, the hydrophilic polymer comprises from about 0.2% to about 1.5% by weight and the hydrophobic compound comprises from about 0.02% to about 0.5% by weight.

Due to the insolubility of hydrophobic compounds in aqueous solutions, the current invention preferably includes a surfactant selected for its ability to promote the dissolution of the hydrophobic compound in the aqueous solution. In general, the surfactants can be anionic, cationic, amphoteric, or neutral. Thus, surfactants suitable for use in the current invention include, but are not limited to, alkyl ammonium surfactants, betaines, alkyl ether sulfates, alkyl ether sulfonates, and ethoxylated alcohols. Particularly preferred surfactants include alkyl ether sulfonates. Typically, the surfactant will be present within the aqueous solution in amounts ranging from about 0.1% to about 2% by weight.

In this aspect, the reaction preferably occurs in situ and is facilitated by use of a pH adjusting agent capable of providing a pH of about 8 or higher to the aqueous solution containing the hydrophilic polymer and hydrophobic compound. Preferred pH adjusting agents include buffers, alkali metal hydroxides, alkali metal carbonates, alkali metal phosphates and other similar compounds known to those skilled in the art.

Thus, a preferred aqueous solution for reducing the water permeability of a subterranean formation comprises a hydrophilic polymer such as poly-dimethylaminoethylmethacrylate, a hydrophobic compound such as cetyl bromide, and a surfactant selected to promote the dissolution of the cetyl bromide in the aqueous solution. The concentration of poly-dimethylaminoethylmethacrylate in the solution may range from about 0.1 to about 2 percent by weight. Preferably, the poly-dimethylaminoethylmethacrylate comprises about 0.2% by weight. The concentration of cetyl bromide may range from about 0.01% to about 1% by weight. The preferred concentration of cetyl bromide is about 0.1% by weight. The preferred surfactant for use with cetyl bromide is an alkyl ether sulfonate and the concentration of the alkyl ether sulfonate may range from about 0.01% to about 1% by weight.

Depending on wellbore and formation conditions, a shut-in period of one minute to several hours may be required to permit the in situ reaction of the hydrophilic polymer and the hydrophobic compound. Typically, the length of the borehole and the g downhole temperature will determine the length of any shut-in period. For example, a deep borehole with temperatures in the range of about 93° C. (200° F.) or greater may not require a shut-in period. In general, shallow, cooler formations will require longer shut-in periods possibly extending up to 24 hours. Those skilled in the art will be able to readily determine the necessity for and the time period of any shut-in periods. During the shut-in period or the transport time downhole, the hydrophilic polymer and the hydrophobic compound react forming the hydrophobically-modified RPM capable of adhering to the formation matrix. The resulting polymer, i.e. the hydrophobically-modified RPM, inhibits water transport through the formation without substantially interfering with hydrocarbon production.

According to yet another further aspect of the invention, the hydrophobically-modified RPM polymer is preferably prepared from the polymerization reaction of hydrophilic monomers and hydrophobically-modified hydrophilic monomers.

Examples of particularly suitable hydrophilic monomers that can be utilized include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide and hydroxyethyl acrylate. Of these, acrylamide, 2-acrylamido-2-methyl propane sulfonic acid, acrylic acid, dimethylaminoethyl methacrylate, dimethylaminopropyl methacrylamide and vinyl pyrrolidone are preferred.

Examples of particularly suitable hydrophobically-modified hydrophilic monomers that can be utilized include, but are not limited to, alkyl acrylates, alkyl methacrylates, alkyl acrylamides and alkyl methacrylamides wherein the alkyl radicals have from about 4 to about 22 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms and alkyl dimethylammoniumpropyl methacrylamide bromide, alkyl dimethylammonium propylmethacrylamide chloride and alkyl dimethylammoniumpropyl methacrylamide iodide wherein the alkyl groups have from about 4 to about 22 carbon atoms. Of these, octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate and hexadecyl methacrylamide are preferred.

Polymers that are useful in accordance with the present invention can be prepared by polymerizing any one or more of the hydrophilic monomers with any one or more of the hydrophobically-modified hydrophilic monomers. Methods for preparing such polymers are known to those skilled in the art as represented by U.S. Pat. No. 6,476,169, which is incorporated herein by reference.

Accordingly, suitable polymers have estimated molecular weights in the range of from about 250,000 to about 3,000,000 and have mole ratios of the hydrophilic monomer(s) to the hydrophobically-modified hydrophilic monomer(s) in the range of from about 99.98:0.02 to about 90:10. Particularly suitable polymers having molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer. Of these, a dimethylaminoethyl methacrylate/hexadecyldimethylammoniumethyl methacrylate bromide copolymer having a mole ratio of hydrophilic monomer to hydrophobically-modified hydrophilic monomer of 95:5 is a preferred pre-reacted hydrophobically-modified RPM.

Again, following preparation of the hydrophobically-modified RPM, the hydrophobically-modified RPM is dissolved in water to form an aqueous solution, preferably in a sufficient quantity to yield a solution having from about 0.05% to about 1% by weight. Water suitable for use in this embodiment of the current invention is defined above.

A well treatment solution comprising the pre-reacted hydrophobically-modified RPM can be adjusted to a pH more suited to the environment of the formation. Typically, the pH of the well treatment solution comprising the prereacted hydrophobically-modified RPM will be between about 4 and about 8, unless mixed with an acidizing treatment fluid.

The aqueous solutions of the present invention may also contain other well treatment compounds such as but not necessarily limited to clay stabilizers, scale inhibitors, and corrosion inhibitors. For example, the aqueous solution may also contain salts suitable for inhibiting the swelling of clays.

Additionally, gelling agents, such as the galactomannan gelling agents described below may be used, preferably in amounts ranging from about 0.06% to about 0.72% by weight. Preferably, the concentration of the galactomannan gelling agent will be in the range of about 0.12% to about 0.36% by weight with the most preferred concentration being about 0.30% by weight.

Further, the solution may optionally contain any suitable proppant known to those skilled in the art.

In order to more completely describe the invention, the following non-limiting examples of forming a hydrophobically-modified RPM are given.

EXAMPLE 1

In this example, a homopolymer of DMAEMA is prepared as follows. To a 3 L round bottom flask is added 1,968 grams of water, and this is sparged with nitrogen for 1.5 hours. Next is added 105 grams of DMAEMA, 25.8 grams concentrated sulfuric acid (to achieve a pH of about 7.9), and 0.46 grams 2,2'-azobis(2-amidinopropane)dihydrochloride. The mixture is then heated to 110° F. under a nitrogen atomosphere, while stirring, and held for 18 hours to produce a highly viscous polymer solution.

The quaternized polymer is produced as follows: To a 250 mL round bottom flask is added 71.0 grams of the DMAEMA homopolymer, as described above, followed by 4.0 grams 15% NaOH (to achieve a pH of about 8.9). Next is added 54.6 grams water, 0.36 grams hexadecyl bromide, and 0.39 grams benzylcetyldimethylammonium bromide. This mixture is then heated to 140° F., while stirring, for 24 hours.

EXAMPLE 2

To prepare a quaternized DMAEMA monomer, to a 100 mL round bottom flask is added 16.7 grams of DMAEMA and 16.2 grams of hexadecyl bromide. The mixture is heated to 110° F. and stirred for 24 hours. The mixture is then poured into 1 liter of petroleum ether, resulting in precipitation of the quaternized monomer. The monomer is collected on a Buchner funnel, washed with excess petroleum ether, collected, and dried in a vacuum dessicator.

To prepare a polymer of DMAEMA and quaternized DMAEMA, to a 250 ml round bottom flask, add the following: 3.8 grams of DMAEMA, 0.7 grams of the quaternized monomer described above, 84.5 grams water, and 1.2 grams concentrated sulfuric acid (achieving a pH of about 7.1). This solution is then sparged with nitrogen for 30 minutes, followed by the addition of 0.035 grams 2,2'-azobis(2-amidinopropane)dihydrochloride. The resulting solution is then heated under a nitrogen atmosphere, with stirring, to 110° F. and held for 18 hours to produce a highly viscous polymer solution.

The resulting hydrophobically-modified RPM polymeric material is dissolved in an aqueous fluid. Any type of water can be used provided any suspended solids, anions and/or cations in the water do not interfere with the relative permeability modifying abilities of the polymeric material. The water used for the well treatment fluid can be of any convenient source, including fresh water, seawater, natural brine, formulated brine, 2% KCl solution, and any mixtures in any proportion thereof. The preferred water for the well treatment fluid is 2% KCl. The polymeric material can also be dissolved in an aqueous salt solution. Representative soluble salts are the chloride, bromide, acetate and formate salts of potassium, sodium, calcium, magnesium, and zinc.

The polymeric material is present in the treatment fluid in an effective amount to preferentially reduce the permeability of water relative to hydrocarbon through the formation. Although it can be lower or higher, this concentration is expected to typically be in the range of about 0.5 wt % to about 1 wt %.

The aqueous solutions of the present invention may also contain other well treatment compounds such as but not necessarily limited to clay stabilizers, scale inhibitors, and corrosion inhibitors.

Additionally, gelling agents, may be used. The galactomannan gelling agents suitable for use in accordance with the present invention are the naturally occurring gums and their derivatives such as guar, locust bean, tara, honey locust, tamarind, karaya, tragacanth, carrageenan, and the like. These gums are generally characterized as containing a linear backbone having various amounts of galactose units attached thereto. The gums can also be characterized as having one or more functional groups such as cis-hydroxyl, hydroxyl, carboxyl, sulfate, sulfonate, amino, or amide. Preferred galactomannan gelling agents suitable for use in the current invention include one or more gelling agents selected from the group of guar, hydroxyethylguar, hydroxypropylguar, carboxymethylguar, carboxymethylhydroxyethylguar, and carboxymethylhydroxypropylguar. Of these, guar is the most preferred.

When it is desired to gel the aqueous solution, one or more of the above-mentioned glactomannan gelling agents are dissolved in water, the gelling agents are hydrated, and a viscous aqueous gel is formed. When used, the galactomannan gelling agent or agents are dissolved in the aqueous solution in an amount in the range of from about 0.06% to about 0.72% by weight, more preferably in an amount in the range of from about 0.12% to about 0.36%, most preferably about 0.30%. Additionally, the solution may optionally contain any suitable proppant known to those skilled in the art.

It is understood with benefit of the present invention that other additives for use in stimulation and well treatments can be employed in the practice of the disclosed method if so desired. For example, thickeners, diversion agents, pH buffers, etc. can be used. Also, internal diverting materials can be used if desired. One example of a suitable diverting agent includes, but is not limited to, viscous water external emulsions.

It should be understood by those skilled in the art that the treatment fluid can be used together with stimulation treatments, ahead of stimulation treatments, or after stimulation treatments. For example, in the case of an acid matrix treatment, the disclosed treatment fluid can be included ahead of the aqueous acid treatment, in the aqueous acid treatment (or both), and are typically introduced at a rate below the flow rate necessary to fracture the formation in a manner similar to the rate employed for a water control treatment fluid injection alone. Whether employed as a stand-alone fluid or in a stimulation fluid (such as an acid fluid or hydraulic fracture fluid), similar concentrations of the polymer compositions are typically employed.

According to the preferred methods of the present invention, an aqueous solution of a pre-reacted hydrophobically-modified RPM or an aqueous solution of a hydrophilic polymer and a hydrophobic compound is preferably introduced into the formation prior to an acidizing treatment.

Without being limited by theoretical explanation, it is believed that the hydrophobically-modified RPM preferentially reduces the permeability of the treated zone to water, which retards migration of an aqueous fluid into the treated section. The charged portion of the resulting compound promotes attachment of the compound to the porosities of the subterranean formation. As a result, the permeability of the treated portion of the formation to water is reduced or eliminated while the permeability of the formation to hydrocarbons is substantially unchanged.

The acidizing treatment fluid is then allowed to permeate and stimulate the hydrocarbon-bearing section. The acidizing treatment fluid is at least partially diverted from the water-bearing section to the hydrocarbon-bearing section. It is believed that the polymeric material has physical and/or chemical properties that help reduce the permeability of water through the water-bearing section, thereby reducing aqueous acid flow into the water-bearing section.

Advantageously, the disclosed polymeric material is relatively non-damaging to hydrocarbon permeability through the hydrocarbon-bearing section, while able to decrease the permeability of water through the water-bearing section without the use of mechanical zonal isolation. However, it should be understood by those skilled in the art that mechanical methods used to isolate the water-bearing section and hydrocarbon-bearing section can be used in conjunction with the present invention.

The methods of the present invention can be implemented in both matrix-acidizing as well as acid fracturing processes. The effectiveness of matrix and fracture acidizing treatments is often dictated by the ability to divert the acid into the areas where it can be most beneficial in opening up the porous medium to the production of hydrocarbon. The following are some non-limiting known methods of acidizing a hydrocarbon bearing formation for use in the present invention: U.S. Pat. No. 3,215,199 to R. E. Dilgren; U.S. Pat. No. 3,297,090 to R. E. Dilgren; U.S. Pat. No. 3,307,630 to R. E. Dilgren et al.; U.S. Pat. No. 2,863,832 to R. L. Perrine; U.S. Pat. No. 2,910,436 to I. Fatt et al.; U.S. Pat. No. 3,251,415 to C. C. Bombardieri; U.S. Pat. No. 3,441,085 to J. L. Gidley; U.S. Pat. No. 3,451,818 to J. L. Gidley et al., which are hereby incorporated by reference. These methods as well as other acidizing treatment methods can be modified to incorporate the separate step of introducing an aqueous treatment fluid containing the polymeric material of the present invention. The treatment steps composed of the polymeric material and the acidizing treatment fluid can be repeated as necessary or desired.

When used in conjunction with a hydraulic fracture treatment, fluid introduction rates (whether utilized as a spearhead, in the fracture treatment, or both) are typically above rates that cause pressures to exceed those necessary to fracture a formation. Thus, the pressure used to inject the aqueous solution of the present invention can be, but need not be high enough to create a fracture in the zone, depending on whether the acid fracturing method or the matrix acidizing method is employed. The volume of the aqueous solution introduced in the well is based on several properties of the zone to be treated, such as depth and volume of the zone, as well as the permeability and other physical properties of the material in the zone.

When necessary, the process of the present invention can be preceded by an optional pretreatment step (preflush) in order to clean the formation to be treated and obtain more effective interaction of the polymeric material with the formation surface. Without being limited by theory, it is believed that the interaction of the polymeric material with the formation surface is dependent upon the presence of any existing adsorbed species, whether these be surface impurities, paraffin, asphaltenes, etc. Thus, a pretreatment step may be necessary for a given formation to be treated. The pretreatment step could include a mutual solvent with the disclosed polymers to form a well treatment fluid. Mutual solvents, among other things, can act to remove hydrocarbon adhering to formation material. In this regard, any mutual solvent suitable for solubilizing hydrocarbon can be employed including, but not limited to, terpenes (such as limonene), $C_3$ to $C_9$ alcohols, glycol-ether (such as ethylene glycol monobutyl ether, "EGMBE"), or mixtures thereof.

The pretreatment can be an aqueous solution that contains a surface-active agent. The pretreatment can also be an aqueous fluid that contains a chemical that interacts with the formation surface within the porous medium and facilitates penetration of the polymeric material further into the hydrocarbon-bearing section as in U.S. Pat. No. 6,364,016, incorporated herein by reference.

Additionally, a shut-in step can follow the step of introducing the polymeric material in order to allow time for the polymeric material to effectively interact with the formation surface.

There are numerous advantages to the use of polymeric material in conjunction with the acidizing treatment fluid. In particular, the methods of the present invention are considerably less expensive than other techniques such as blocking the flow of water with cross-linked polymers and zonal isolation techniques. The present invention provides an improved method to acidize a subterranean formation that reduces preferential stimulation of the water-bearing sections, thereby increasing stimulation in sections capable of producing hydrocarbon.

In order to more completely describe the invention, the following non-limiting examples are given:

EXAMPLE 3

This example illustrates how the polymeric material of the present invention can affect the permeability of the water in sandstone lithology. Darcy's Linear Flow Equation was used to determine the permeability of the porous media. Parameters for the permeability measurements include: core dimensions of about 6 inches in length by 1-inch diameter (having a cross sectional area of about 5.07 square centimeters); brine viscosity of about 1 centipoise; a differential pressure across the core of about 22 atmospheres; and a temperature of 175° F. In this example, the following abbreviations were used: Water Core=Brown Sandstone; Oil Core=Berea Sandstone; water=API Brine of 9% NaCl and 1% $CaCl_2$; oil=kerosene; RPM polymeric material=2000 ppm of hydrophobically-modified polydimethylaminoethyl methacrylate in 2% KCl Water; Spacer Water=5% $NH_4Cl$; Acid=5% HCl; Overflush Water=5% $NH_4Cl$; Kwro=Permeability to water at residual oil; Korw=Permeability to oil at residual water. The effective permeability of each of the cores was determined individually before and after the treat sequence using the parallel flow system FIG. 1. The water core flow sequence was water-oil-water. The oil core flow sequence was water-oil-water-oil.

Figure 2:
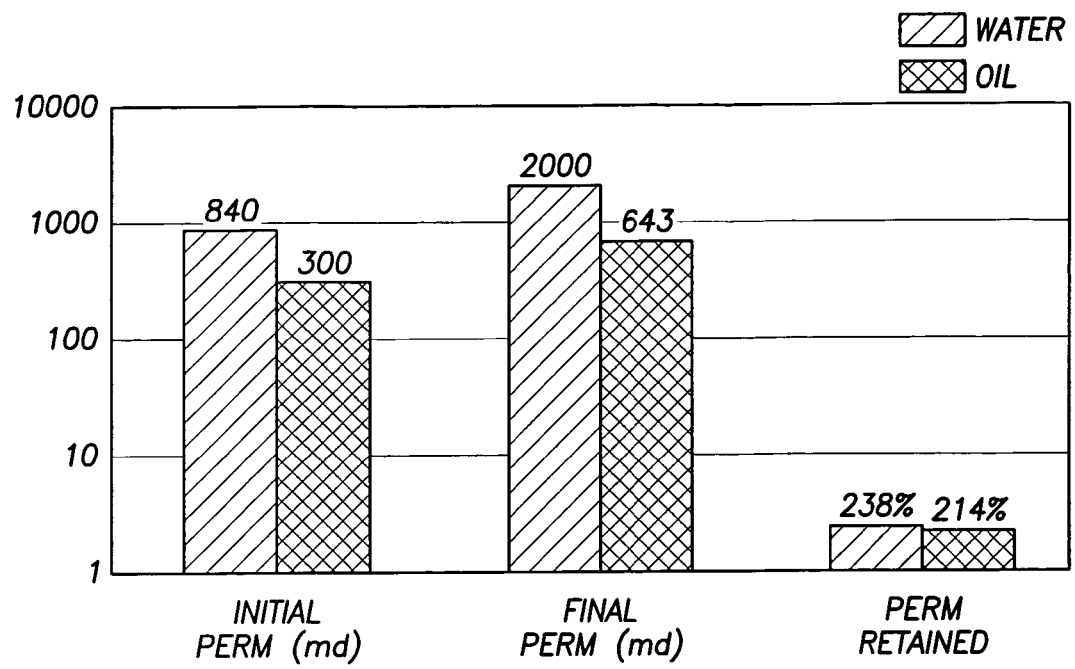
FIG. 2 is a control test showing effect of 5% HCl acid treatment on sandstone water core (residual oil) and sandstone oil core (residual water). Note approximate 200% increase in permeability for both cores. The treatment sequence was in parallel flow using the setup shown in FIG. 1. Treatment sequence was spacer-acid-spacer.

FIG. 2 illustrates a control test showing the effect of 5% HCl acid treatment on sandstone water core (residual oil) and sandstone oil core (residual water). Note approximate 200% increase in permeability for both cores. The treatment sequence was in parallel flow using the setup shown in FIG. 1. Treatment sequence was spacer-acid-spacer.

Figure 3:
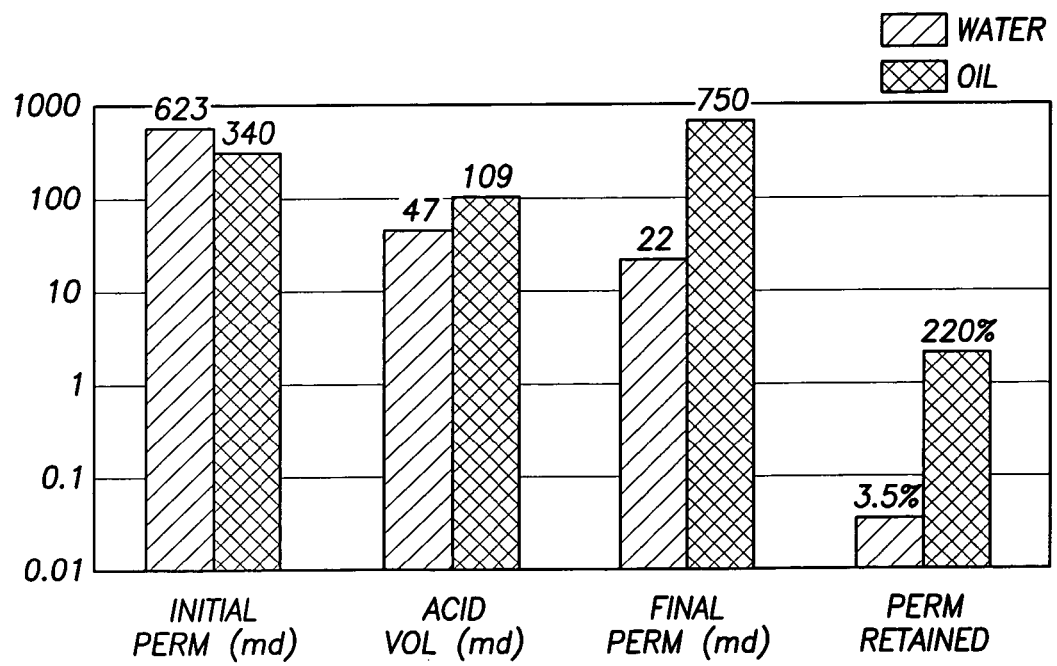
FIG. 3 is a test of the effect of hydrophobically-modified RPM ahead of 200 cc acid stimulation of sandstone cores. Hydrophobically-modified RPM diverted most of the acid away from the water core and into the oil core. Permeability of the water core was reduced to 3.5% of original while permeability of the oil core was increased same amount as the control (See FIG. 2). The treatment sequence was in parallel flow using the setup shown in FIG. 1. Treatment sequence was RPM-spacer-acid-spacer.

FIG. 3 illustrates the effect of hydrophobically-modified RPM ahead of 200 cc acid stimulation of sandstone cores. Hydrophobically-modified RPM diverted most of the acid away from the water core and into the oil core. Permeability of the water core was reduced to 3.5% of original while permeabilty of the oil core was increased same amount as the control (See FIG. 2). The treatment sequence was in parallel flow using the setup shown in FIG. 1. Treatment sequence was RPM-spacer-acid-spacer.

The first column pair in FIG. 3 illustrates the initial stabilization of the water core and the oil core. The permeability to water at residual oil is 623 md. The permeability to oil at residual water is 340 md. The next column pair in FIG. 3 compares the volume of the acid which passed through the water core and the oil core where a hydrophobically-modified RPM preflush was used ahead of the acid; according to the principles of the present invention. The third column pair in FIG. 3 shows the final permeability of the water and oil cores after the hydrophobically-modified RPM/Acid sequence. Finally, the fourth column pair in FIG. 3 shows the percent effective water permeability following the treatment. Note that the impact of the acid treatment on the oil core is similar to that shown in the control test (see FIG. 2) (220% increase in permeability to oil), whereas the net result on the water core (which was a higher permeability core) was a reduction of 96.5% to the effective permeability to water.

EXAMPLE 4

The following example illustrates how the polymeric material of the present invention can affect the permeability of the water in Bedford Limestone lithology, using flow cell temperatures at 175° F. with a system pressure of 200 psi. The Bedford Limestone used in the present example is of 99% calcite and a trace amount of quartz. The "Bullhead" Placement Technique (Parallel Core Flow shown in FIG. 1) was used to acquire the data of the present example, the steps of which will now be described in detail. The flow testing was performed as described using the sandstone cores in Example 3. The results are summarized in Table 1.

TABLE 1

Summary of hydrophobically-modified DMAEMA treatment fluid via "Bullhead" Placement Technique

| Parameter | Water Core: Bedford Limestone | Oil Core: Bedford Limestone |
|---|---|---|
| Length (cm) | 14.27 | 14.04 |
| Diameter (cm) | 2.52 | 2.52 |
| $K_{wro}{}^1$ Before Treatment/Acid | 9.8 | NA |
| $K_{wro}{}^1$ Treatment/Acid | NA | 28.3 |
| Treatment fluid Vol.$^3$ (ml) | 2.4 | 19.2 |
| Over displacement Vol.$^4$ (ml) | 7 | 2.3 |
| Volume 5% HCl$^5$ (ml) | 25 | 175 |
| Volume Acid Overflush$^6$ (ml) | NA | NA |
| $K_{wro}{}^1$ After Treatment Acid | NA | NA |
| $K_{orw}{}^2$ After Treatment Acid | NA | NA |
| % Retention to Kwro | NA | NA |
| % Increase to $K_{orw}$ | NA | NA |

$^1K_{wro}$ = Effective permeability to water (API Brine) at residual oil saturation (mD).
$^2K_{orw}$ = Effective permeability to oil (kerosene) at residual water saturation (mD).
$^3$Volume of 2000 ppm hydrophobically-modified DMAEMA treatment fluid (ml) that passed through designated core during "bullhead" placement technique.
$^4$Volume of 5.2 ml of 5% NH$_4$Cl overflush (ml) that passed through designated core immediately behind hydrophobically-modified DMAEMA treatment.
$^5$Volume of 200 ml of 5% HCl (ml) that passed through designated core
$^6$Annulus pressure loss on oil core due to extreme "wormhole" created by acid halted testing.
NA = Not Applicable.

In the water core, the effective permeability to water (API Brine) at residual oil saturation is 9.8. In the oil core, the effective permeability to oil at residual water saturation is 28.3. The volume of 2,000 ppm hydrophobically-modified DMAEMA treatment fluid (ml) that passed through the water core was 2.4 ml, whereas 19.2 ml had passed through the oil core. It is believed this difference is due to the relative permeabilities of the hydrophobically-modified DMAEMA treatment fluid through the oil core versus the water core.

As a result of the treatment fluid, the subsequently added acidizing treatment fluid was primarily directed to the oil core. Specifically, 175 ml of the 200 ml of the 5% HCl acid treatment was directed to the oil core, whereas only 25 ml of the 200 ml of the acid treatment entered the water core. Thus, this example illustrates acid treatment diversion is possible in Bedford Limestone subterranean formations.

As illustrated in Table 1, several parameters from those listed above (annotated by NA) could not be measured due to the high solubility of the Bedford Limestone in acidic solution.

The invention is described with respect to presently preferred aspects and embodiments, but is not intended to be limited to the described embodiments. It will be readily apparent to those of ordinary skill in the art that numerous modifications may be made to the invention without departing from the scope and spirit of the invention as defined by the claims.

What is claimed is:

1. A method of stimulating a subterranean formation penetrated by a well comprising the steps of:
    (a) introducing into the formation an aqueous treatment fluid containing a hydrophobically-modified, water-soluble relative permeability modifier (hydrophobically-modified RPM), wherein the hydrophobically-modified RPM is the reaction product of a hydrophilic polymer and a hydrophobic compound that are capable of reacting with each other wherein the hydrophilic polymer is a polymer containing reactive amino groups in the polymer backbone or as pendant groups, which are capable of reacting with a hydrophobic alkyl halide compound, and wherein the hydrophobic compound is an alkyl halide having an alkyl chain length of 6 to 22 carbons; and
    (b) introducing an acidizing treatment fluid into the formation.

2. The method of claim 1, wherein the hydrophilic polymer is a homo-polymer, co-polymer, or ter-polymer.

3. The method of claim 1, wherein the hydrophilic polymer contains dialkyl amino pendant groups.

4. The method of claim 1, wherein the hydrophilic polymer contains a dimethyl amino pendant group and contains at least one monomer selected from the group consisting of dimethylaminoethyl methacrylate and dimethylaminopropyl methacrylamide.

5. The method of claim 1, wherein the hydrophilic polymer is an alkyl acrylate polymer.

6. The method of claim 1, wherein the hydrophilic polymer is selected from the group consisting of polyethyleneimine, polyvinylamine, poly(vinylamine/vinyl alcohol), chitosan, and polylysine.

7. The method of claim 1, wherein the hydrophilic polymer is selected from the group consisting of polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide).

8. The method of claim 1, wherein the hydrophilic polymer is selected from the group consisting of polydimethylaminoethyl methacrylate and polydimethylaminopropyl methacrylamide.

9. The method of claim 1, wherein the hydrophobic alkyl halide compound is an alkyl halide having an alkyl chain length of 6 to 22 carbons.

10. The method of claim 9, wherein the hydrophobic alkyl halide compound is hexadecyl bromide.

11. The method of claim 1, wherein the hydrophobically-modified RPM is a homopolymer of DMAEMA quaternized with hexadecyl bromide.

12. The method of claim 1, wherein the hydrophobically-modified RPM is dissolved in an aqueous solution and then injected into the formation.

13. The method of claim 1, wherein the hydrophobically-modified RPM is introduced into the formation by mixing the hydrophilic polymer and the hydrophobic alkyl halide compound in the aqueous treatment fluid in situ during the well stimulation process.

14. The method of claim 13, wherein the hydrophilic polymer comprises from about 0.1% to about 2% by weight of the aqueous treatment fluid and the hydrophobic compound comprises from about 0.01% to about 1% by weight of the aqueous treatment fluid.

15. The method of claim 13, wherein the hydrophilic polymer comprises about 0.2% to about 1.5% by weight of the aqueous treatment fluid and the hydrophobic compound comprises from about 0.02% to about 0.5% by weight of the aqueous treatment fluid.

16. The method of claim 13, wherein the aqueous treatment fluid further comprises a surfactant to promote the dissolution of the hydrophobic compound in aqueous treatment fluid.

17. The method of claim 16, wherein the surfactant is selected from the group consisting of alkyl ammonium surfactants, betaines, alkyl ether sulfates, alkyl ether sulfonates, and ethoxylated alcohols.

18. The method of claim 16, wherein the surfactant is present within the aqueous solution in amounts ranging from about 0.1% to about 2% by weight.

19. The method of claim 1, wherein the hydrophobically-modified RPM is a polymeric material having molecular weights in the range of about 250,000 to about 3,000,000.

20. The method of claim 1, wherein the hydrophobically-modified RPM is present in the aqueous treatment fluid in a concentration from about 0.02% to about 3% by weight.

21. The method of claim 1, wherein the hydrophobically-modified RPM is present in the aqueous treatment fluid in a concentration from about 0.05% to about 1% by weight.

22. The method of claim 1, wherein the aqueous treatment fluid is at a pH of between about 4 and about 8.

23. A method of stimulating a subterranean formation penetrated by a well comprising the steps of:
  (a) introducing into the formation an acieous treatment fluid containing a hydrophobically-modified, water-soluble relative permeability modifier (hydrophobically-modified RPM), wherein the hydrophobically-modified RPM polymer is prepared from the polymerization reaction of at least one hydrophilic monomer and at least one hydrophobically-modified hydrophilic monomer, and wherein hydrophobically-modified RPM is capable of being dissolved in water at a concentration of at least 0.2% by weight and is capable of imparting a resistance factor for water of greater than a resistance factor for hydrocarbon as measured across a sandstone core of about 2.5 cm diameter by about 14 cm long and having an initial permeability to brine of about 1,000 md; and
  (b) introducing an acidizing treatment fluid into the formation.

24. The method of claim 23, wherein the hydrophilic monomer is selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, and hydroxyethyl acrylate.

25. The method of claim 23, wherein the hydrophobically-modified hydrophilic monomer is selected from the group consisting of alkyl acrylates, alkyl methacrylates, alkyl acrylamides and alkyl methacrylamides wherein the alkyl radicals have from about 4 to about 22 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 6 to about 22 carbon atoms and alkyl dimethylammoniumpropyl methacrylamide bromide, alkyl dimethylammonium propylmethacrylamide chloride, and alkyl dimethylammoniumpropyl methacrylamide iodide, wherein the alkyl groups have from about 4 to about 22 carbon atoms.

26. The method of claim 23, wherein hydrophobically-modified RPM is a polymeric material having molecular weights in the range of from about 250,000 to about 3,000,000.

27. The method of claim 23, wherein hydrophobically-modified RPM has mole ratios of the hydrophilic monomer(s) to the hydrophobically-modified hydrophilic monomer(s) in the range of from about 99.98:0.02 to about 90:10.

28. The method of claim 23, wherein hydrophobically-modified RPM is a dimethylaminoethyl methacrylate/hexadecyldimethylammoniumethyl methacrylate bromide copolymer having a mole ratio of hydrophilic monomer to hydrophobically-modified hydrophilic monomer of 95:5.

29. The method of claim 1, wherein hydrophobically-modified RPM is capable of being dissolved in water at a concentration of at least 0.2% by weight and is capable of imparting a resistance factor for water of greater than a resistance factor for hydrocarbon as measured across a sandstone core of about 2.5 cm diameter by about 14 cm long and having an initial permeability to brine of about 1,000 md.

30. The method of claim 23 or 29, wherein when the hydrophobically-modified RPM is tested at the concentration of 0.2% by weight, it is capable of imparting a resistance factor for water of greater than about 1 and a resistance factor for hydrocarbon of less than about 2.

31. The method of claim 1 or 23, wherein the hydrophobically-modified RPM is introduced into the formation prior to the acidizing treatment fluid.

32. The method of claim 1 or 23, further comprising the step of shutting in the well after introducing the polymeric material into the well.

33. A method of acidizing a subterranean formation penetrated by a well comprising the steps of:
(a) introducing into the formation an aqueous treatment fluid containing from about 0.02% to about 3% by weight of a hydrophobically-modified, water-soluble relative permeability modifier (hydrophobically-modified RPM) that is the reaction product of a hydrophilic polymer and a hydrophobic compound that are capable of reacting with each other, wherein the hydrophilic polymer is a polymer containing reactive amino groups in the polymer backbone or as pendant groups, which are capable of reacting with a hydrophobic alkyl halide compound having an alkyl chain length of 6 to 22 carbons, and wherein the hydrophobic compound is an alkyl halide having an alkyl chain length of 6 to 22 carbons; and
(b) introducing an acidizing treatment fluid into the formation.

34. The method of claim 33, wherein the hydrophobically-modified RPM is dissolved in an aqueous solution and then injected into the formation.

35. The method of claim 33, wherein the hydrophobically-modified RPM is introduced into the formation by mixing the hydrophilic polymer and the hydrophobic alkyl halide compound in the aqueous treatment fluid in situ during the well stimulation process.

36. A method of acidizing a subterranean formation penetrated by a well comprising the steps of:
(a) introducing into the formation an aqueous treatment fluid containing from about 0.02% to about 3% by weight of a hydrophobically-modified, water-soluble relative permeability modifier (hydrophobically-modified RPM) that is prepared from the polymerization reaction of at least one hydrophilic monomer and at least one hydrophobically-modified hydrophilic monomer,
wherein the hydrophobically-modified hydrophilic monomer is selected from the group consisting of alkyl acrylates, alkyl methacrylates, alkyl acrylamides and alkyl methacrylamides wherein the alkyl radicals have from about 4 to about 22 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 6 to about 22 carbon atoms and alkyl dimethylammoniumpropyl methacrylamide bromide, alkyl dimethylammonium propylmethacrylamide chloride, and alkyl dimethylammoniumpropyl methacrylamide iodide, wherein the alkyl groups have from about 4 to about 22 carbon atoms; and
(b) introducing an acidizing treatment fluid into the formation.

37. The method of claim 36, wherein the hydrophobically-modified RPM is dissolved in an aqueous solution and then injected into the formation.

38. The method of claim 36, wherein the hydrophobically-modified RPM is introduced into the formation by mixing the hydrophilic polymer and the hydrophobic alkyl halide compound in the aqueous treatment fluid in situ during the well stimulation process.

39. The method of claim 36, wherein the hydrophilic monomer is selected from the group consisting of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, and hydroxyethyl acrylate.

40. A method of stimulating a subterranean formation penetrated by a well comprising the steps of:
(a) introducing into the formation an aqueous treatment fluid containing a hydrophobically-modified, water-soluble relative permeability modifier (hydrophobically-modified RPM), wherein hydrophobically-modified RPM is a dimethylaminoethyl methacrylate/hexadecyldimethylammoniumethyl methacrylate bromide copolymer; and
(b) introducing an acidizing treatment fluid into the formation.

41. The method according to claim 40, wherein the dimethylaminoethyl methacrylate/hexadecyldimethylammoniumethyl methacrylate bromide copolymer has a mole ratio of hydrophilic monomer to hydrophobically-modified hydrophilic monomer of 95:5.

* * * * *